United States Patent [19]
Ohtomo et al.

[11] Patent Number: 6,016,455
[45] Date of Patent: Jan. 18, 2000

[54] AUTOMATIC CONTROL SYSTEM FOR CONSTRUCTION MACHINERY

[75] Inventors: Fumio Ohtomo; Kazuaki Kimura, both of Tokyo, Japan; Vernon J. Brabec, Pleasanton, Calif.; Satoshi Hirano, Pleasanton, Calif.; Makoto Omori, Pleasanton, Calif.

[73] Assignee: Kabushiki Kaisha Topcon, Tokyo, Japan

[21] Appl. No.: 08/967,144

[22] Filed: Nov. 10, 1997

[51] Int. Cl.[7] ................................................. G01B 11/14
[52] U.S. Cl. ................................................ 701/50; 356/73
[58] Field of Search ............................... 701/50; 37/907; 235/454, 467; 356/4.08, 5.08, 139.06, 141.1, 141.4, 138, 152.1, 73; 172/4.5; 359/833, 834

[56] References Cited

U.S. PATENT DOCUMENTS

| | | | |
|---|---|---|---|
| 4,732,471 | 3/1988 | Cain et al. | 356/152 |
| 5,572,809 | 11/1996 | Steenwyk et al. | 37/348 |

*Primary Examiner*—Tan Nguyen
*Attorney, Agent, or Firm*—Limbach & Limbach, L.L.P.

[57] ABSTRACT

An automatic control system for a construction machine includes the construction machine provided with a ground leveling implement, a target, and a laser sensor; a survey unit that has a coordinate position measuring element and projects a beam of tracking light indicating a finished-plane height toward the target; a storage unit for storing finished-plane height data in correspondence with a horizontal coordinate position in the coordinate position; a computation unit for computing the finished-plane height data; a modulation unit for modulating the laser beam, based on construction information at the horizontal coordinate position, and for transmitting the construction information to the laser sensor; and a demodulation unit fox demodulating the construction information, based on the laser beam received by the laser sensor. The survey unit is equipped with a finished-height data drive mode in which the laser beam is rotated in a vertical direction by a rotation unit so that the height of the laser beam at the horizontal coordinate position becomes a height from the determined finished plane. The construction machine is provided with a control unit for controlling the ground leveling implement so that it reaches the finished-plane height, based on a position at which the laser beam is received on the laser sensor, and also controlling the ground leveling implement, based on the demodulated construction information.

10 Claims, 9 Drawing Sheets

AUTOMATIC CONTROL SYSTEM FOR CONSTRUCTION MACHINERY

BACKGROUND OF THE INVENTION

1. Field of the Invention

The present invention relates to an improvement in an automatic control system for construction machines which automatically perform leveling of ground and paving. The construction machines are used in the civil engineering and construction field and include, for example, motor graders, pavers, and bulldozers.

2. Description of the Related Art

In the civil engineering and construction field, the ground leveling implements of a construction machine, such as a blade and a screed, are automatically controlled in performing ground leveling and paving.

In the system for automatically controlling a ground leveling implement that is used in a construction machine, a ground leveling string corresponding to a finished cross section is stretched over the construction side in order to obtain an expected finished surface. The interval between the ground leveling string and the ground leveling implement is detected with a contact type cantilever or a non-contact type ultrasonic sensor. Based on the detection result, the ground leveling implement is controlled so as to follow the ground leveling string by oil pressure. However, the system for automatically controlling a ground leveling implement so that the implement follows a ground leveling string requires a great deal of labor to stretch a ground leveling string over a construction site.

Hence, there has been proposed an automatic control system for construction machinery which is capable of automatically controlling a ground leveling implement and obtaining an expected finished surface without stretching a ground leveling string over a construction site.

An example of the aforementioned automatic control system is shown in FIG. 1. In the figure, reference numeral 1 denotes a bulldozer which is a construction machine for leveling a construction site, 2 a rotating laser unit installed in a construction site, 3 a blade which is a ground leveling implement, 4 a pole stood up in the blade 3, and 5 a laser sensor fixed to the pole 4.

The rotating laser unit 2 forms a reference plane Rs at a position of a predetermined height (h) away from a finished plane 6 by means of a generated laser beam. The blade 3 is controlled so that the laser light from the rotating laser unit 2 strikes against the vertical center Ho of the laser sensor 5 (center Ho in the height direction of the laser sensor 5), by an oil pressure control unit 7 serving as ground leveling implement control means. In this way, the ground of a construction side is leveled to an expected finished plane 6. According to this automatic control system for construction machines, a ground leveling operation and a paving operation can be simply performed compared with an operation of stretching a ground leveling string over a construction site.

However, in the case where the ground 6' and finished plane 6 of a construction site have a complicated configuration with undulations and inclination, the rotating laser unit 2 has to be reinstalled as shown in FIG. 2 in order to obtain the reference plane Rs. For this reason, in the case of the leveling and paving of complicated ground, there will arise the problem that the operation for reinstalling the rotating laser unit 2 will be troublesome.

Hence, another system for automatically controlling the construction machine 1 has been proposed. This system employs an automatic tracking type survey unit, also called a total tracking station (which is available as "AP-L1" manufactured by TOPCON). The automatic tracking type survey unit measures a distance to a target, a horizontal angle between a reference direction and a direction in which the target exists, and a vertical angle between a reference height and a direction in which the target exists, and tracks the target.

FIG. 3 illustrates an example of the system for automatically controlling a construction machine by employing an automatic tracking type survey unit. In the figure, reference numeral 8 denotes an automatic tracing type survey unit, which is installed at the known coordinate point O of a construction block. The survey unit 8 is connected to a personal computer (PC) 9, which is in turn connected to a radio transmitter 10. A bulldozer 1 is provided with a blade 3, a pole 4 stood up in the blade 3, an oil pressure control unit 7, a prism 11 attached to the pole 4 as a target to be tracked, and a radio receiver 12.

The PC 9 stores finished-height data in correspondence with each horizontal coordinate position in the construction block. The survey unit 8 tracks the prism 11 and measures the distance from the known coordinate position O to the prism 11 and the horizontal angle between a reference direction and a direction in which the prism 11 exists. Based on the measured distance and horizontal angle, the survey unit 8 computes the coordinate position data or horizontal coordinate position data of the prism 11 (target) relative to the known coordinate O. The computed coordinate position data or horizontal coordinate position data is transferred from the survey unit 8 to the PC 9.

The PC 9 calls out finished-height data corresponding to the computed horizontal coordinate position, that is, finished-height data relative to the known coordinate point O. Then, the PC 9 transfers the finished-height data to the radio transmitter 10. The radio transmitter 10 transmits the finished-height data to the radio receiver 12. The oil pressure control unit 7 controls the blade 3, based on the finished-height data received by the radio receiver 12. The blade 3 digs or cuts ground so that the ground has a designed finished height (construction height). Note that the aforementioned finished-height data is referred to as a height relative to known coordinate point O.

The system for automatically controlling a construction machine with the automatic tracing type survey unit 8 has the advantage that the finished plane of complicated ground can be created without increasing the number of steps, because the blade 3 is controlled based on finished-height data (construction data).

However, in a construction site the operators are in contact with each other by using transceivers and there is radio noise developed by construction machines. The aforementioned system always requires a unit which transmits construction data from the survey unit 8 to the bulldozer 11 in a construction site by radio. Therefore, there is the possibility that interference and communication jamming will take place, and reliability will be a problem.

SUMMARY OF THE INVENTION

It is an object of the present invention to provide an automatic control system for a construction machine which is difficult to be influenced by radio noise, interference, and the like.

To achieve this end, there is provided an automatic control system for a construction machine, comprising: a ground leveling implement a target, and a laser sensor provided in the construction machine; a survey unit, provided with coordinate position measuring means for optically measuring the coordinate position of the target, for projecting a laser beam indicating a finished-plane height toward the laser sensor; storage means for storing finished-plane height data in correspondence with a horizontal coordinate position in the coordinate position; computation means for computing the height of a finished plane, based on the determined finished-plane height data; modulation means for modulating the laser beam, based on construction information at the horizontal coordinate position, and for transmitting the construction information to the laser sensor; and demodulation means for demodulating the construction information, based on the laser beam received by the laser sensor. The survey unit is equipped with a finished-height data drive mode in which the laser beam is rotated in a vertical direction by rotation means so that the height of the laser beam at the horizontal coordinate position becomes a height from the determined finished plane. The construction machine is provided with control means for controlling the ground leveling implement so that the ground leveling implement is located at the finished-plane height, based on a position at which the laser beam is received on the laser sensor, and also controlling the ground leveling implement, based on the demodulated construction information.

The survey unit may be equipped with an automatic vertical tracking mode in which the rotation means is controlled so that the target is tracked with respect to a height direction, and when a measured coordinate position of the target is outside a predetermined range, the survey unit may be switched from the finished-height data drive mode to the automatic vertical tracking mode.

The laser sensor and the target may also be integrally stood up in the ground leveling implement.

When data on the coordinate position of the target from the survey unit, the computation means controls the rotation means, based on the predetermined height data, which is stored in the storage means, from a lower edge of the ground leveling implement to a vertical center of the laser sensor and based on the finished-plane height data.

The survey unit can measure a distance from itself to the target.

The construction information may be inclination information of the ground leveling implement. Also, the construction information may be management information of a center line of road construction or drive information of the construction machine. Furthermore, in the automatic vertical tracking mode, the construction information may be vertical deviation data.

In the finished-height data drive mode, the computation means may compute the deviation between a height of the target based on the finished-plane height data at the horizontal coordinate position and an actually measured height of the target. In this case, data of the deviation is stored and the deviation data is employed as construction evaluation information.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 4:
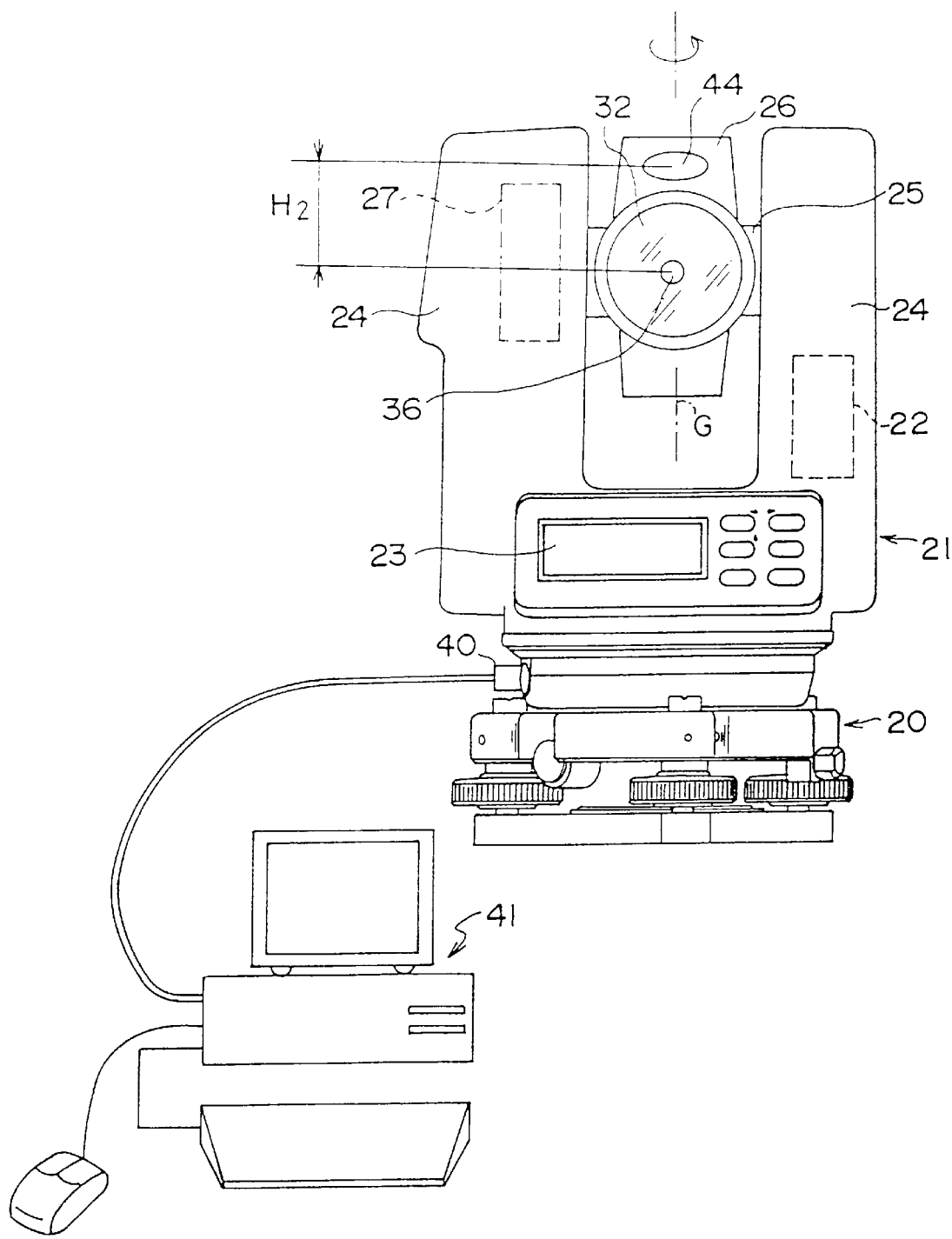
FIG. 4 is a schematic diagram showing an automatic tracking type survey unit according to an embodiment of the present invention.

Referring to FIG. 4, there is shown a total tracking station according to an embodiment of the present invention. In the figure, reference numeral 20 denotes a base portion and 21 a main body portion. The main body portion 21 is horizontally rotated on a vertical axis G by horizontal rotation means 22. The main body portion 21 has a display portion 23 and a pair of support portions 24. The support portions 24 are connected together by a horizontal shaft 25. The horizontal shaft 25 is provided with a lens barrel portion 26, which is in turn vertically rotated on the horizontal shaft 25 by vertical rotation means 27. The quantity of horizontal rotation of the main body portion 21 and the quantity of vertical rotation of the lens barrel portion 26 are detected by a rotary encoder (not shown).

Figure 5:
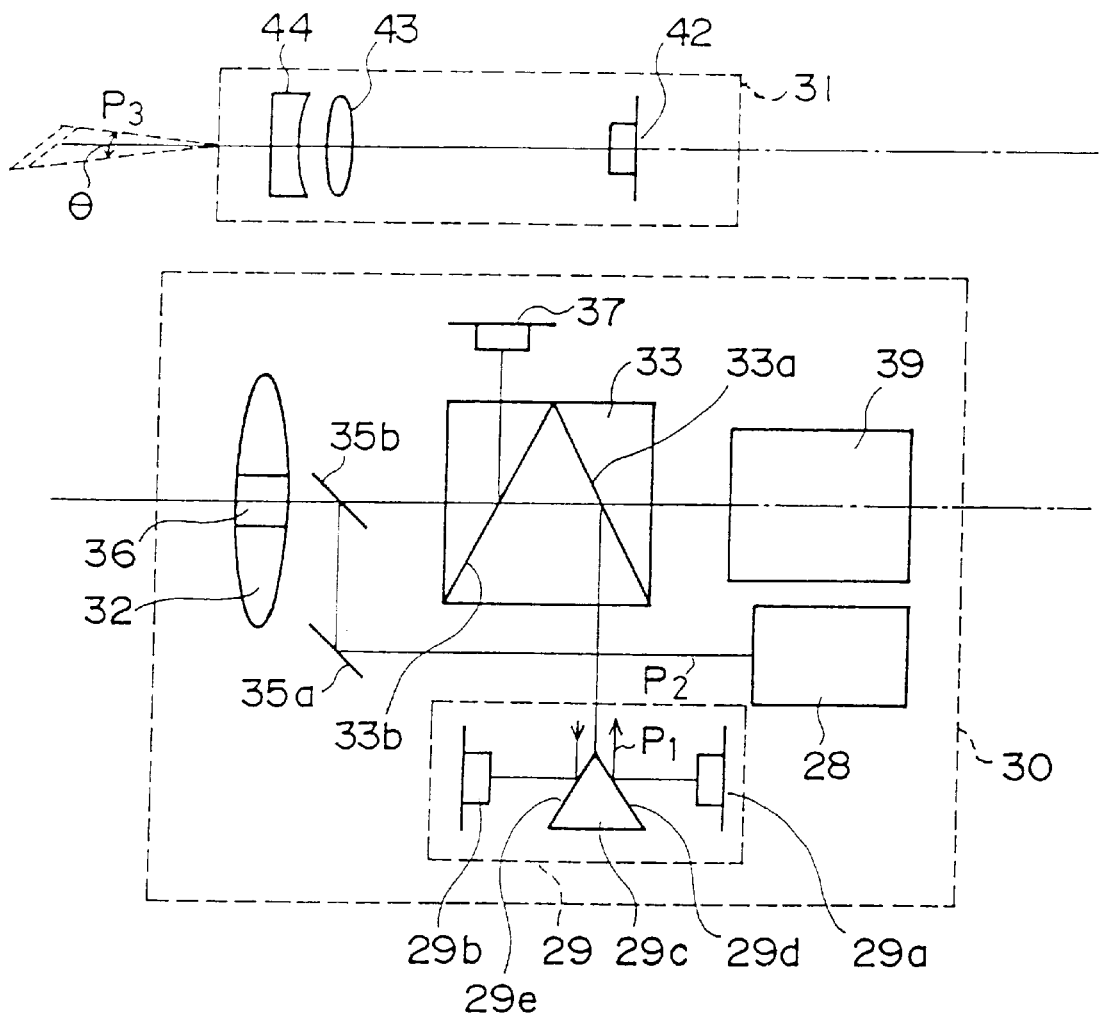
FIG. 5 is a block diagram showing the interior structure of the lens barrel portion shown in FIG. 4.

The lens barrel portion 26 is constituted by a tracking and measuring unit portion 30 and a laser beam unit portion 31 which emits a fan-like laser beam P3, as shown in FIG. 5. The tracking and measuring unit portion 30 comprises a horizontal tracking-light generating portion 28 and a light wave distance meter (EDM) portion 29 which measures a distance to a target (prism).

The tracking unit portion 30 has an objective lens 32 which is shared by a tracking operation and a distance measuring operation. The EDM portion 30 is constituted by a first light emitting element 29a, a second light emitting element 29b, and a split mirror 29c. The distance measuring light P1, emitted from the first light emitting element 29a and modulated with a specific frequency, is reflected by the reflecting surface 29d of the split mirror 29c and the reflecting surface 33a of a dichroic mirror 33. The reflected light P1 is passed through the lower half of the objective lens 32 and is guided to a prism 34 (see FIG. 6) which is a target. The modulated light, reflected by the prism 34, is condensed by the upper half of the objective lens 32 and is reflected by the reflecting surface 33a of the dichroic mirror 33. The light reflected by the dichroic mirror 33 is reflected by the reflecting surface 29e of the split prism 29c and is guided to the second light emitting element 29b.

The EDM portion 29 is equipped with a processing circuit (not shown). The processing circuit measures the phase difference between an emitted-light signal modulated with a specific frequency and a received-light signal, and measures the distance to the prism 34, from the measured phase difference. The dichroic mirror 33 is equipped with a second reflecting surface 33b, which in turn transmits the distance measuring light P1 emitted from the first light emitting element 29a and reflects tracking light P2 to be described later.

The tracking portion 28 has a two-dimensional scanning portion for moving a laser light beam P2 in a two-dimensional direction of X-Z. The two-dimensional scanning portion is constituted by a laser diode, a collimator lens for converting laser light (tracking light P2) emitted from the laser diode to a collimated beam of light, an oscillating mirror, and an acoustic-optic element. Since the two-dimensional scanning portion is well known in the prior art, an illustration thereof is omitted. For the illustration of the scanning portion, see FIG. 3 of Japan Published Unexamined Patent Application No. HEI 5-322569.

The scanning beam (tracking light) P2 emitted from the two-dimensional scanning portion is reflected by a first mirror 35a and a second mirror 35b. The reflected light is passed through the center hole 36 of the objective lens 32 and is directed toward the prism 34. The tracking laser light P2 reflected by the prism 34 is focused by the entire surface of the objective lens 32, is reflected by the reflecting surface 33b of the dichroic mirror 33, and is focused on a light receiving element 37. The wavelength of the tracking light P2 is different from that of the distance measuring light P1 emitted from the light emitting element 29a.

Figure 6:
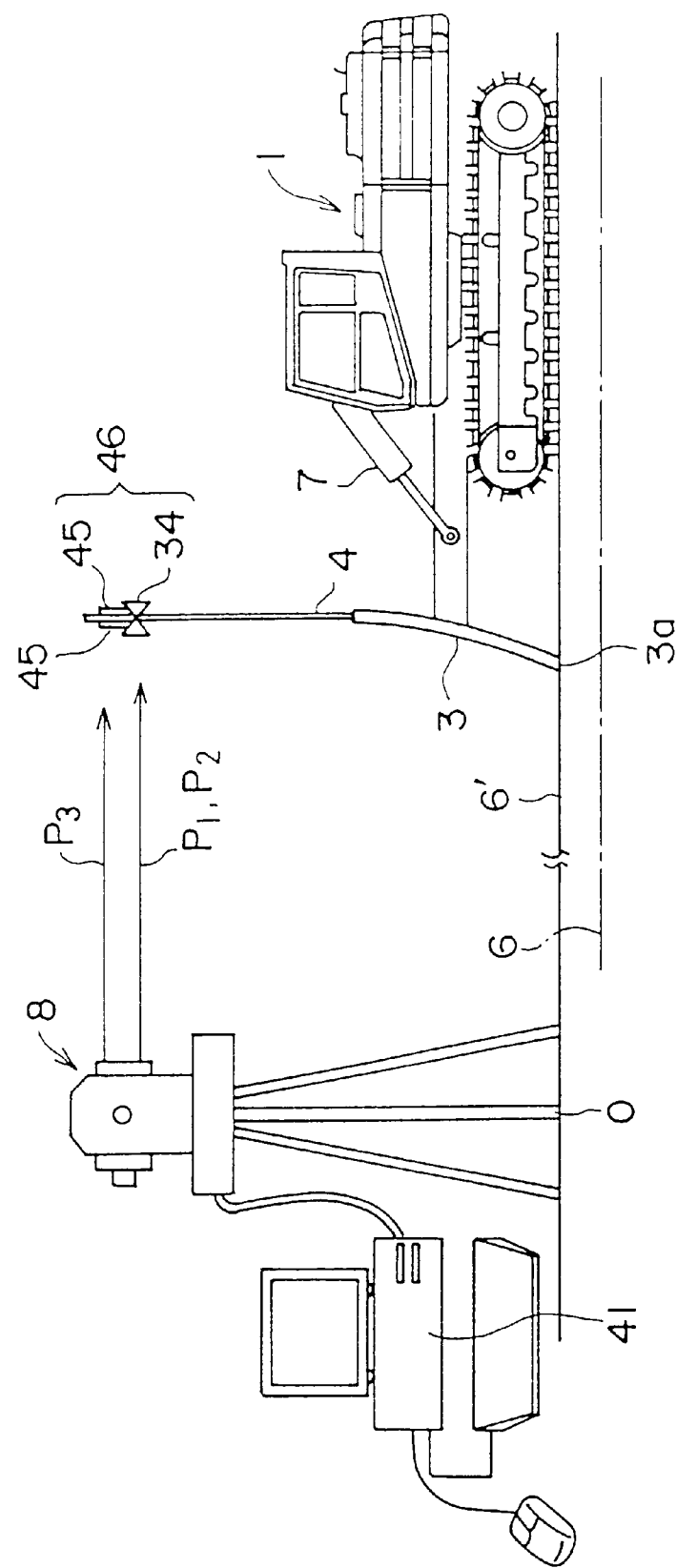
FIG. 6 is a side view used to explain an example of a ground leveling operation according to the present invention.
Figure 7:
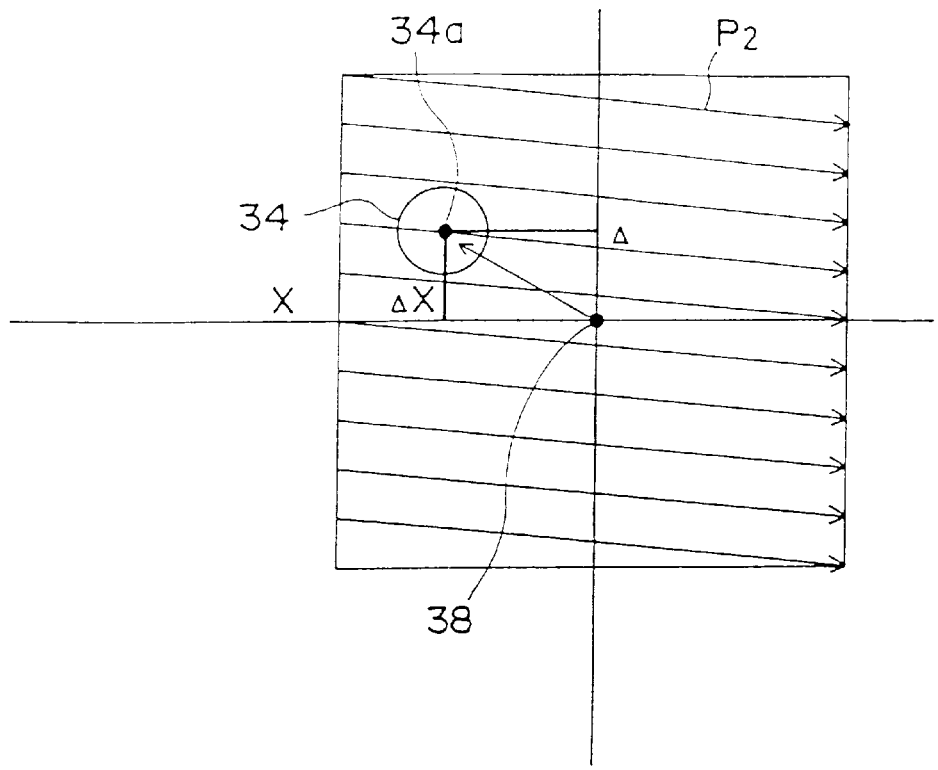
FIG. 7 is an explanatory diagram showing how a two-dimensional scanning operation is performed.

The position detection of the prism 35 will be performed as follows:

As shown in FIG. 7, a predetermined area is scanned in a raster fashion in an X-Z direction by the scanning light P2 emitted from the two-dimensional scanning portion of the tracking portion 28. When the scanning light P2 strikes against the prism 34, it is reflected. The reflected light (tracing light) P2, as described above, is focused by the objective lens 32 and returns to the light receiving element 37. The processing circuit (not shown) detects at which timing a received-light signal was received during scanning, Rand measures the X-direction deviation ΔX and Z-direction deviation ΔZ of the center position 34a of the prism 34 relative to a scanning center 38. The measured deviations ΔX and ΔZ are converted to the horizontal rotational quantity of the support portion 24 and the vertical rotational quantity of the lens barrel 26, which are in turn fed back to the horizontal rotation means 22 and vertical rotation means 27. In this way, the automatic tracking type total station 8 (FIG. 6) can be controlled so as to be aligned with the center of the prism 34. The objective lens 32 and eyepiece 39 as a whole constitute a telescope. The operator can align the survey unit 8 with a target (prism 34) through the telescope. The survey unit 8 is equipped with a finished-height data drive mode and an automatic vertical (height-direction) tracking mode. These modes will be described later.

The total tracking station 8 has an incorporated central processing unit (CPU), which functions as part of the processing circuit (not shown). The incorporated CPU computes the horizontal coordinate position and height coordinate position of the target (prism 34), based on the distance to the prism 34, horizontal angle, and vertical angle obtained by measurement. The incorporated CPU serves as coordinate position measuring means for optically measuring the coordinate position of the target. The computed horizontal coordinate position is displayed on the display portion 23, and data on the coordinate position of the target is output to an input-output port 40. The input-output port 40 is usually constituted by RS-232C and is connected to an external personal computer (PC) 41. The PC 41 transmits and receives data between it and the CPU of the total tacking station 8. In this embodiment, the PC 41 controls the operating mode of the total tracking station 8.

The laser beam unit portion 31 is roughly constituted by a laser diode 42, a collimator lens 43, and a cylindrical lens 44. Laser light emitted from the laser diode 42 is collimated by the collimator lens 43. The collimated beam of light is converted by the cylindrical lens 44 to a fan-like laser beam P3 having a horizontal spread. The horizontal spread angle θ is set to a slightly wider angle than the horizontal tracking angle of the total tracking station 8. With this, even in the case where the tracking light P2 is departed slightly from the target 34, the fan-like laser beam P3 will strike against the laser sensor 45 provided in the ground leveling implement 3 of the bulldozer 1. Therefore, even when the direction of the bulldozer 1 is slightly changed, the ground leveling and paving operations will be guaranteed. The fan-like laser beam P3 carries construction information data modulated by a modulation circuit to be described later. The construction information is employed to control the ground leveling implement 3.

Figure 8:
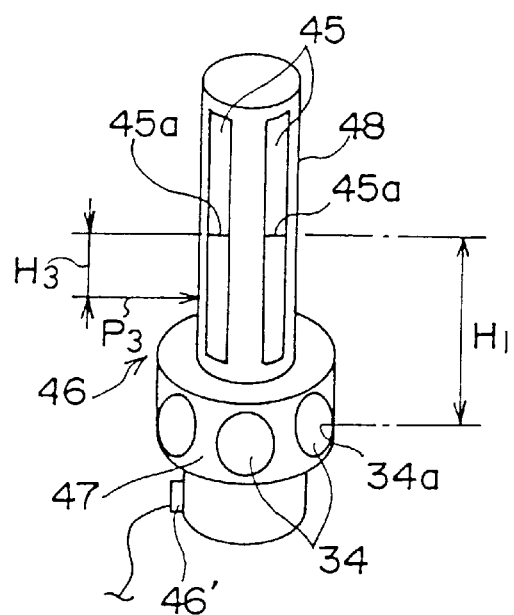
FIG. 8 is an enlarged perspective view showing the prism (target) and laser sensor shown in FIG. 6.

The pole 4, stood up in the ground leveling implement 3, is provided with a light receiving unit 46 shown in FIG. 8. The light receiving unit 46 is constituted by a stepped cylinder. The stepped cylinder 46 has a large-diameter cylindrical portion 47 on the lower side and a small-diameter cylindrical portion 48 on the upper side. The exterior circumferential portion of the large-diameter cylindrical portion 47 is provided with a plurality of prisms 34 over the entire circumference at predetermined intervals. The exterior circumferential portion of the small-diameter cylindrical portion 48 is provided with a plurality of laser sensors 45 over the entire circumference at predetermined intervals. With this, the total tracking station 8 can track the bulldozer 1 even if the direction of the bulldozer 1 is changed in a direction of 360 degrees.

The offset value H1 between the center position 34a of the prism 34 and the center position 45a of the laser sensor 45 is a given value. For example, the value H1 can be assumed to be the same as the offset value H2 between the center of the objective lens 32 and the center of the cylindrical lens 44 shown in FIG. 4. The laser sensor 45 has length enough to cover both the vertical vibration of the construction machine 1 and the vertical tracking precision of the ground leveling instrument 3 which is controlled by oil pressure. The laser sensor 45 outputs the deviation H3 between the position at which the fan-like laser beam P3 from the total tracking station 8 is radiated and the center position 45a of the laser sensor 45. This kind of laser sensor 45 employs a light receiving element array consisting of a plurality of microscopic light receiving elements arranged in series, a position sensor (PSD) for outputting current corresponding to the position at which the fan-like laser beam P3 is received, or the like. The data of the deviation H3 between the radiated position of the fan-like laser beam P3 and the center position 45a of the laser sensor 45 is output to the construction machine 1 through a connector 46'. The data of the deviation H3 is employed by the oil pressure control unit 7 which controls the ground leveling implement 3 of the construction machine 1 in an up-and-down direction. The oil pressure control unit 7 drives the ground leveling implement 3 in the up-and-down direction, and the ground leveling implement 3 is controlled so that the fan-like laser beam P3 strikes against the center position 45a of the laser sensor 45, and then digs or cuts ground 6'.

The operating procedure up to the aforementioned will hereinafter be described with reference to FIG. 6.

The prism 34 and the laser sensor 45 are installed on the ground leveling implement 3 of the construction machine 1 at a predetermined height by employing the pole 4. Next, the automatic total tracking station 8 is installed on a known coordinate point O at a clear place in the construction site. The automatic total tracking station is connected to the PC 41 in which the three-dimensional design data (finished-height data at each horizontal coordinate position) of the construction site has been stored. To the PC 41, the horizontal coordinate position of the known point of the automatic total tracking station 8, the machine height, and the height from the lower edge 3a of the ground leveling implement 3 to the vertical center position 45a of the laser sensor 45 are input. The operation of the automatic total tracking station 8 is started toward the laser sensor 45 and the prism 34.

The automatic total tracking station 8 always tracks horizontal movement of the prism 34. The EDM portion 29 measures a distance to the prism 34. At this time, an up-and-down direction is not tracked. For this reason, there are cases where the position of the prism 34 does not face the distance measuring axis. In such cases, measurement of distance is possible if the distance measuring light P1 of the EDM portion 29 has an appropriate spread.

The horizontal coordinates X and Y of the laser sensor 45 are calculated from the angle data and distance data of the rotary encoder (not shown) of the automatic total tracking station 8 and are output to the PC 41.

The PC 41 compares the calculated coordinates X and Y with design data and computes finished height Y at the horizontal coordinates. The fan-like laser beam P3 of the automatic total tracking station 8 outputs an instruction to the vertical rotation means 27 to maintain the finished height Z (i.e., height from the finished plane 6 to the vertical center of the laser sensor). The automatic total tracking station 8 moves the lens barrel 26 in the vertical direction according to the instruction.

At the time the movement of the lens barrel 26 has been ended, the vertical deviation with respect to the coordinate position of the prism 34 in correspondence with the finished height Z, in other words, the deviation between a height of the target based on the finished-plane height data at the horizontal coordinate position and an actually measured height of the target (see deviation $\Delta Z$ in FIG. 7) is detected. The detected vertical deviation is output to the PC 41 as construction evaluation data. The PC 41 records the construction evaluation data on the memory thereof. The laser sensor 45 detects at which position on the laser sensor 45 the fan-like laser beam P3 is radiated, and outputs the deviation between the center position 45a and the radiated position to the drive control unit of the oil pressure control unit 7. The oil pressure control unit 7 controls the ground leveling implement 3 up and down according to the deviation.

In the control system according to the present invention, the aforementioned operation is repeated each time the automatic total tracking station 8 measures distance. In this way, ground 6 is cut or dug by the ground leveling implement 3 and is finished to an expected finished plane.

According to this embodiment of the present invention, the automatic total tracking station 8 does not track in the height direction the target installed in the ground leveling implement 3 of the construction machine 1 which vibrates and is controlled up and down, but the station 8 performs tracking based on the design data transmitted from the PC 41. Therefore, high precision construction becomes possible. In addition, the automatic total tracking station 8 always detects the vertical deviation $\Delta Z$ of the prism 34, and therefore, if the deviation is recorded and stored, it can be used as construction evaluation data.

In the case where a road is constructed, there are cases where the ground leveling implement 3 is controlled not only in an up-and-down direction but also in an oblique direction. For example, when the bank slope and waterspout slope of a curve in a road are created, the ground leveling implement is obliquely inclined.

In the case of a conventional non-automatic construction method, inclination quantities (percent display) are shown at suitable intervals with bulletins, the operator of the construction machine 1 recognizes them visually, and the ground leveling implement 3 is manually controlled. Also, in the case of road construction, a position on a flat plane, such as a center line, is basically controlled and the operator needs to trace it accurately, unlike the leveling of a horizontally spread housing site and farmland. These operations are also performed visually by the operator.

Figure 1:
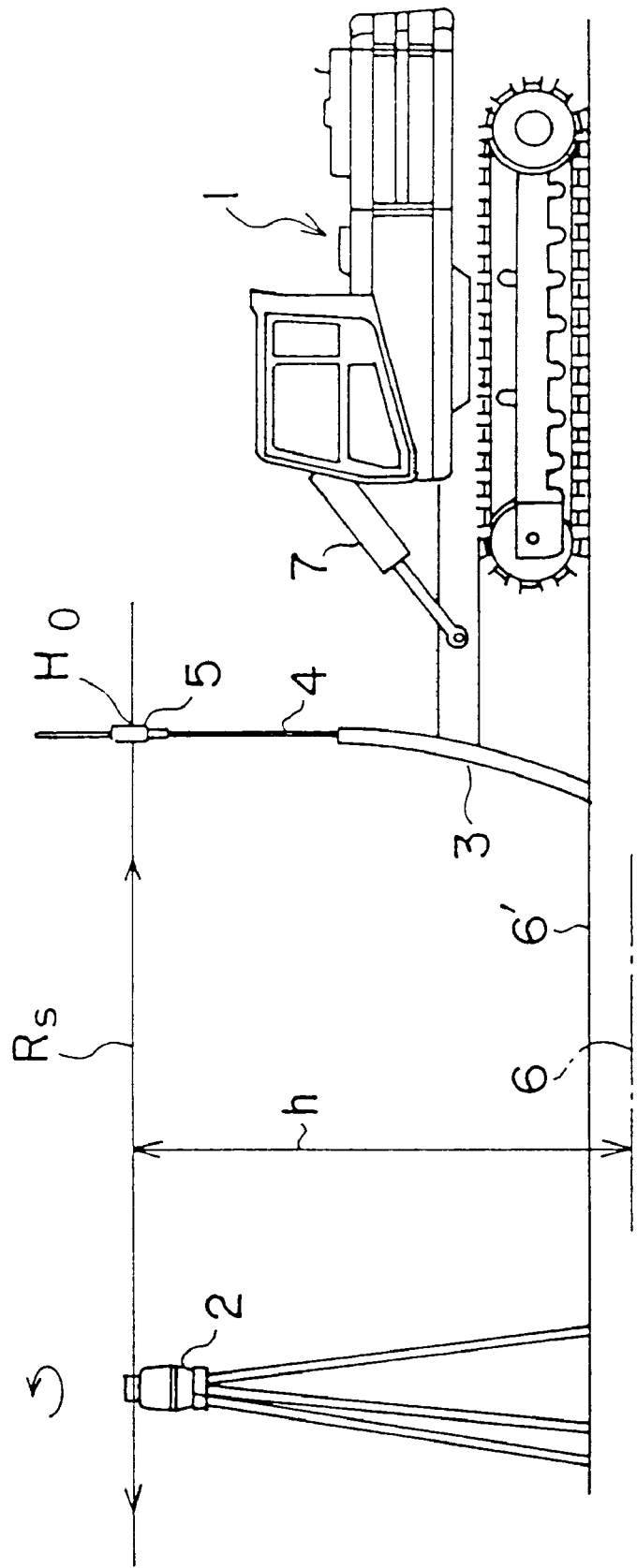
FIG. 1 is a side view showing a conventional automatic control system for a construction machine which employs a rotating laser unit.
Figure 2:
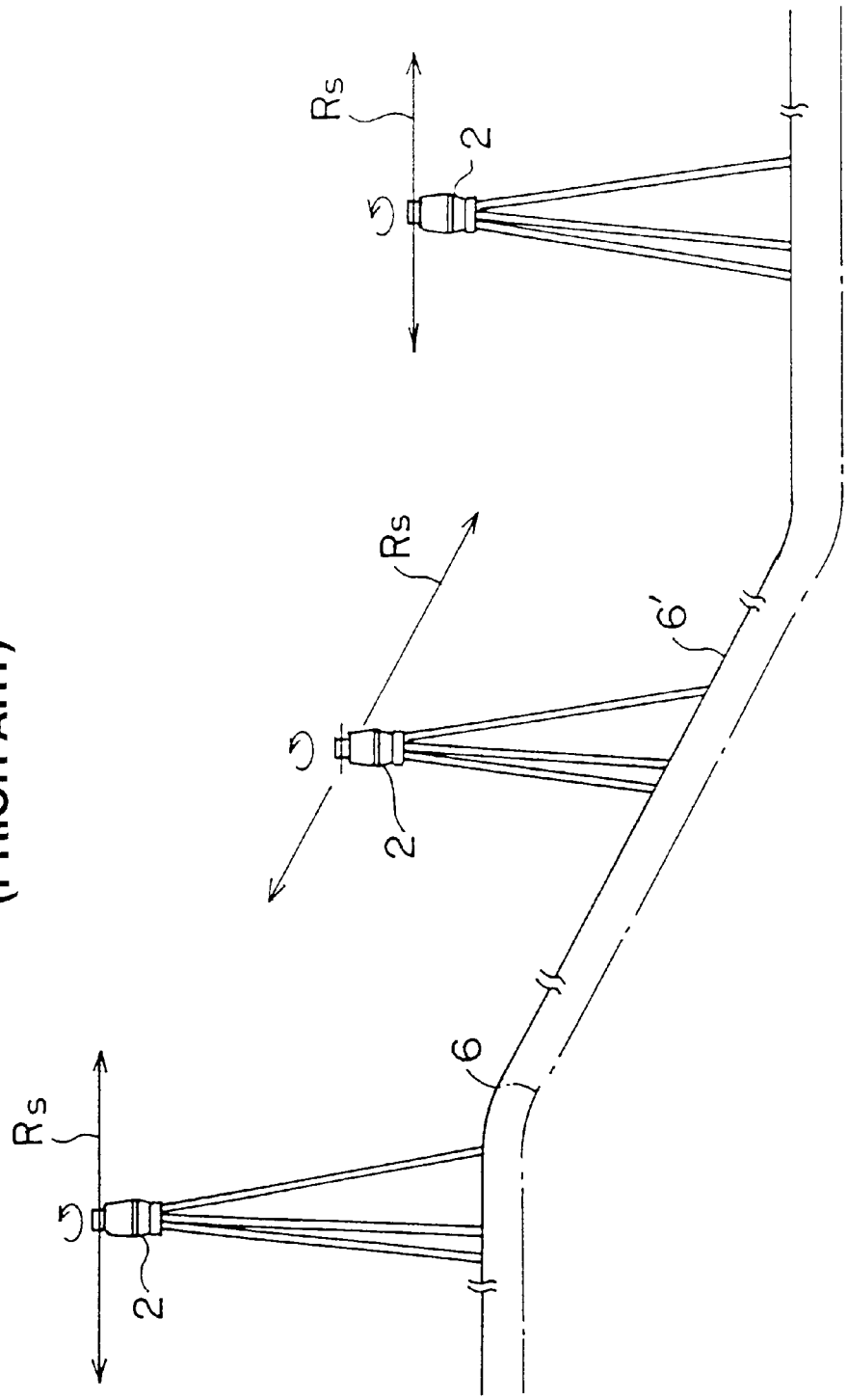
FIG. 2 is a side view used to explain the disadvantages of the conventional automatic control system shown in FIG. 1.
Figure 3:
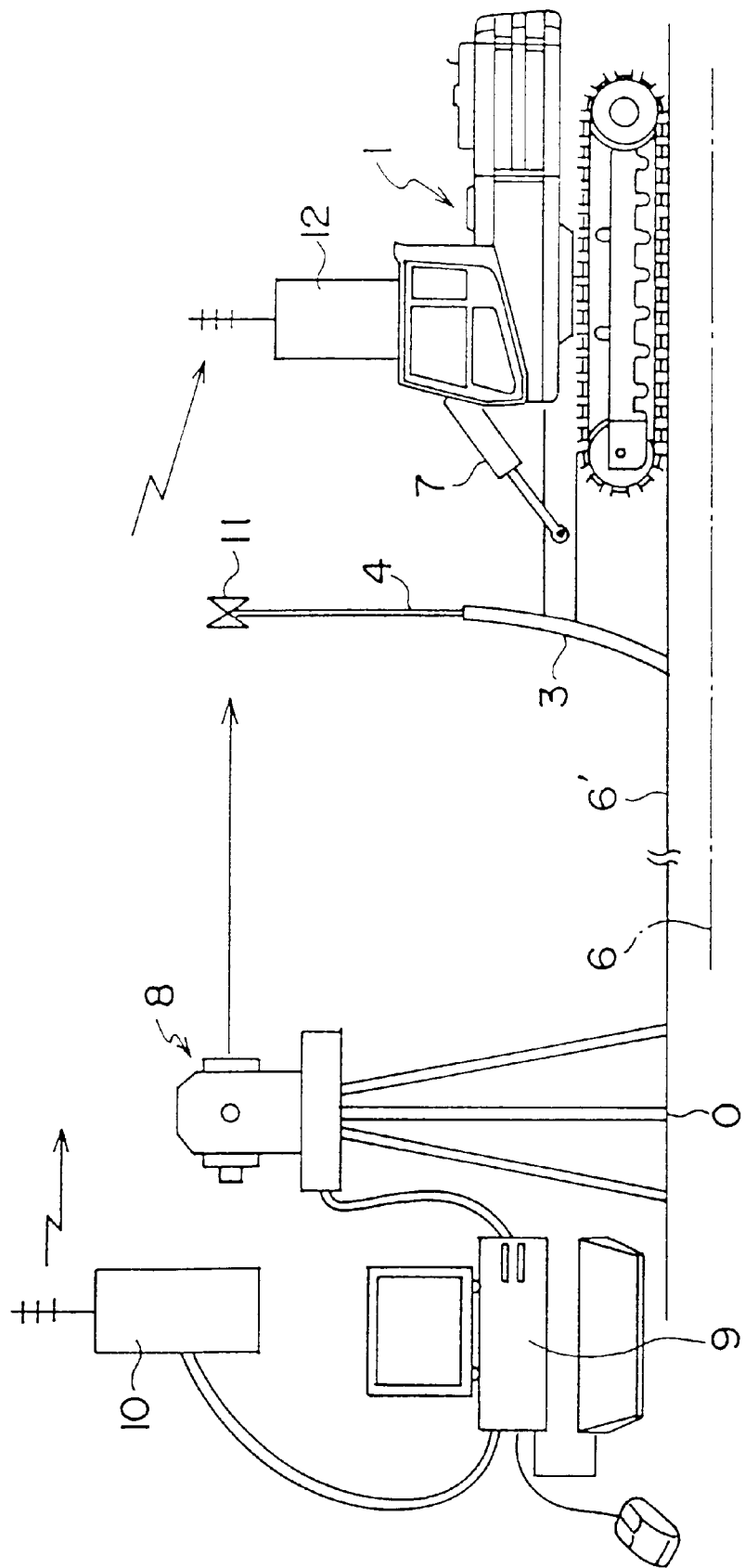
FIG. 3 is a side view showing another conventional automatic control system for a construction machine which employs an automatic tracking type survey unit.

On the other hand, in the case of the control system, where the automatic total tracking station 8 according to the present invention and the PC 41 stored with design data are combined, the horizontal coordinate position of the construction machine 1 can be measured by the automatic total tracking station 8 and design data has been stored in the PC 41. Therefore, the construction information (inclination angle, etc.) required for construction can be all computed by the PC 41. In the aforementioned conventional method, as shown in FIG. 3, the computed construction information is used as drive information of the construction machine and is transferred by radio communication, and consequently, there are various problems such as communication jamming.

In the present invention, by employing optical communication to be described hereinafter, construction information can be transferred toward the construction machine 1 without being subjected to communication jamming and interference.

That is, in the present invention, construction information is modulated to the laser beam P3 and sent, and the laser beam P3 is received and demodulated by the laser sensor 45, thereby taking out the construction information.

Figure 9A:
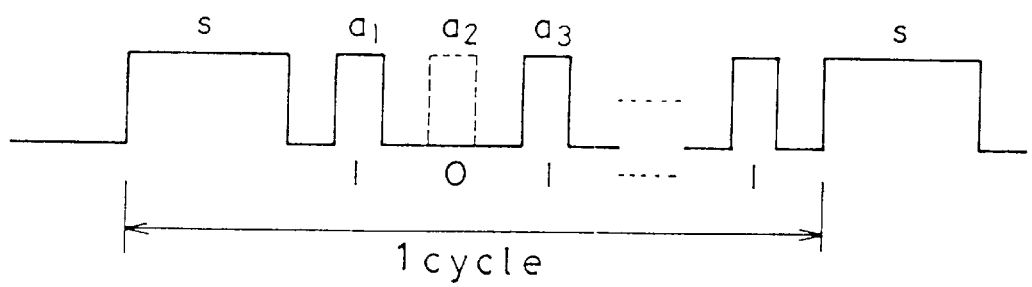
FIG. 9a is a diagram showing a modulated laser beam.

FIG. 9 shows an example of data modulation, and FIG. 9a shows a signal modulated by an ASK method. In FIG. 9c, reference character S denotes a synchronous pattern representing the start of blocks of data, and a1, a2, a3, . . . represent serial data bits, respectively. In FIG. 9a, in order to easily detect the synchronous pattern S, the width is a few times greater than each width of data bits a1, a2, a3, . . . . The data bits following the synchronous pattern S indicate binary data (for example, 1, 0, 1, . . . ).

Figure 9B:
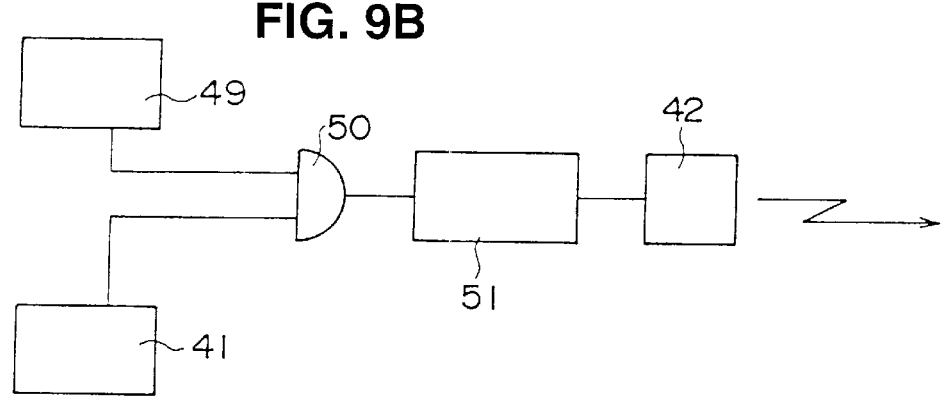
FIG. 9b is a block diagram showing a modulation circuit.

FIG. 9b shows a modulation circuit. In the figure, reference numeral 49 denotes an oscillator and 50 a gate circuit. The oscillator 49 outputs a carrier wave, and the gate circuit 50 performs ASK modulation on the serial data transmitted from the PC 41. A drive circuit 50 causes the laser diode 42 to emit light, while modulating the laser diode, based on serial data. The fan-like laser beam P3 is data-modulated. The modulated laser beam P3 is sent to the laser sensor 45. In this way, construction information is transmitted to the laser sensor 45.

Figure 10A:
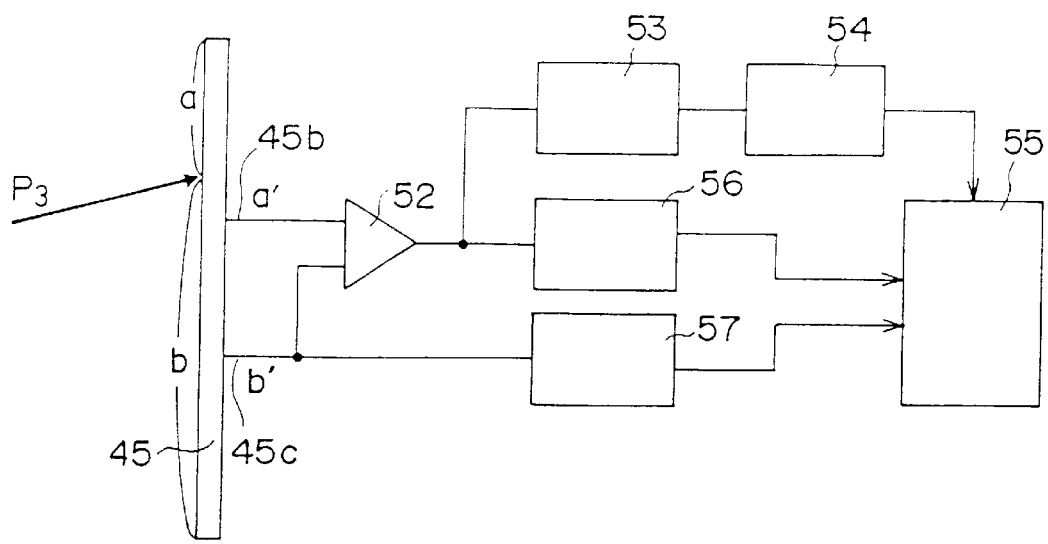
FIG. 10a is a block diagram showing a demodulation circuit.
Figure 10B:
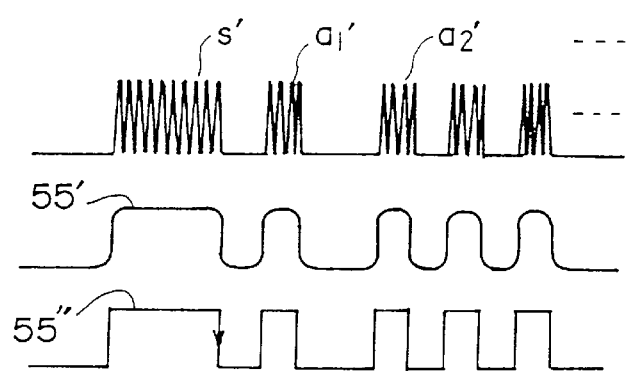
FIG. 10b is a diagram showing a demodulated signal.

FIG. 10 shows a data demodulation circuit. A position sensor (PSD) is employed as the laser sensor 45. Also, a method of detecting the radiated position of the fan-like laser beam P3 will be described. In FIG. 10(b), S', a1', a2'.

. . represent the demodulated laser beam P3. Since noise is piled up on the fan-like laser beam P3, the waveform is deformed.

The laser sensor 45 has two output lines 45b and 45c. The laser sensor 45 outputs electric signals a' and b' whose amplitudes are proportional to the radiated positions (a, b) of the fan-like laser beam P3. The electric signals a' and b' are input to an addition circuit 52 and are added. With this addition, all signals received are obtained. The output of the addition circuit 52 is input to an envelope detector 53, which in turn detects an envelope detection signal 55'. The envelope detection signal 55' is input to a waveform shaping circuit 54, and a rectangular wave 55' is obtained. The rectangular wave 55' is input to the CPU 55 of the construction machine 1. The CPU 55 detects the synchronous pattern S in which data bits 1's continue at more than a constant interval, and from the timing at which the detected synchronous pattern S rises, it is judged whether the input signal, input for every constant interval, is a 0 or a 1. With this, reconstruction information is demodulated Also, the output of the addition circuit 52 and the output b' of the output line 45c are input to A/D converters 56 and 57, respectively. The CPU 55 reads the outputs of the A/D converters 58 and 57 at the timing at which the synchronous pattern S is detected. Based on an equation of a'/(a'+b'), a computation is performed, thereby detecting the vertical radiated position of the fan-like laser beam P3.

In the aforementioned embodiment, while ASK modulation and demodulation have been described, other known methods, such as a PSK method, may be utilized. Also, although a PSD has been employed as a light receiving element, a light receiving element array and other elements with an equivalent function may be employed.

In addition, there is the possibility that the distance measuring light P1 and tracking light P2 of the EDM portion 29 will be incident on the light receiving element of the laser sensor, and it is possible that the light will be noise. In such a case, the wavelengths of the light P1 and light P2 need to be different from that of the fan-like laser beam P3 so that light P1 and light P2 are separated from fan-like laser beam P3. Furthermore, a wavelength selection type optical filter is disposed on the front surface of the laser sensor 45, thereby preventing the incidence of the distance measuring light P1 and tracking light P2 upon the laser sensor 45.

The steps of the measurement of distance, tracking, and communication can be performed in a time-division manner. If done like this, the light P1 and the light P2 will not be radiated after detection of the synchronous pattern S and therefore the laser sensor 45 can receive the light P3 stably. In this case, the entire processing speed becomes slow, but the interference between the light P1, light P2, and light P3 is prevented, so there is the advantage that an expensive wavelength selection type filter is unnecessary.

According to the present invention, the automatic total tracking station 8 does not track the target 34 in an up-and-down direction, but it controls the ground leveling implement 1, based on the design data stored in the PC 41. With this structure, when the ground leveling implement 3 is controlled in an up-and-down direction, the tracking light P2 tracks the target 34 in the up-and-down direction. This tracking changes the vertical position of the fan-like laser beam P3. The ground leveling implement 3 is controlled in the up-and-down direction by a change in the radiated position of the fan-like laser beam P3 of the laser sensor 4, and the hunting phenomenon which is the disadvantage of the conventional system is avoided. As a result, good precision construction in a height direction becomes possible.

However, in the construction prior to final finishing, high precision is not required and construction is repeated many times. With the repetition of the operation, a land creating operation is gradually performed as a design value requires. That is, in an initial stage of construction, the road surface in the present condition is often considerably offset from a designed value. According to the aforementioned embodiment, the height of the fan-like laser beam P3 at a target horizontal coordinate position is always indicated by design data. Therefore, when a ground level for rough finishing is considerably offset from a designed height and firmer than other ground levels, laser sensor 45 with a length corresponding to this is required. In the case where a ground level for rough finishing is uniformly offset up or down from a designed height, lengthening the length of the laser sensor 45 can be avoided if a constant offset value is given to designed height data. However, in the case where land with a complicated configuration is leveled, the laser sensor 45 must be lengthened with increased cost.

According to the following embodiment, when a ground level for rough finishing is considerably offset from a designed height, construction can be accurately performed without lengthening the laser sensor 45, even if the ground for rough finishing is partially firmer than the ground at other places.

For example, the required construction precision at the time of final finishing is taken to be ±5 mm. The longitudinal length of the light receiving surface of the laser sensor is taken to be 10 times ±5 mm, that is, ±5 cm. In this case, if construction is performed within ±5 cm relative to a designed value with a single ground leveling operation, the laser sensor 45 can reliably receive the fan-like laser beam P3 radiated from the automatic total tracking station 8 within a construction block and therefore there is no problem. However, in the case where the present surface condition is bad and, for example, there are many places offset from a designed value, or when ground is partially firm and therefore construction cannot be performed within ±5 cm with a single ground leveling operation, the laser sensor 45 is considerably departed from the fan-like laser beam P3 and therefore the laser sensor will not be able to receive the fan-like laser beam P3.

However, the automatic total tracking station 8 always detects the vertical position of the prism 34. Therefore, the automatic total tracking station 8 can know how the present construction condition is offset from a designed value.

Hence, the automatic total tracking station 8 is constituted so that if a ground leveling operation is beyond a predetermined range (for example, ±4 cm), vertical tracking as well as horizontal tracking is automatically started as in a standard automatic total tracking station.

More specifically, the automatic total tracking station 8 is switched from a finished-height data drive mode to an automatic vertical tracking mode when the aforementioned vertical deviation ΔZ of the prism 34 exceeds ±4 cm. The vertical rotation means 27 deflects the tracking light P2 so that it is positioned at the vertical center position 34a of the prism 34.

At this time, the data of the received position of the fan-like laser beam P3 is not used as height control data, but the height deviation data (difference between a designed value and a detected prism height) transmitted from the automatic total tracking station is used as control data. The height data is transmitted to the laser sensor 45 by modulating the fan-like laser beam P3. This switching is performed with status information contained in the control data which is transmitted from the automatic total tracking station 8.

In the above case, although the automatic total tracking station 8 also performs vertical tracking and, therefore, precision is degraded, no hindrance will arise because this operation is originally performed when ground is considerably offset from a designed value.

For ground with a considerable offset value from a designed value, the ground leveling operation is repeated by the aforementioned method. If the offset value is within a constant range (for example, ±3 cm) in succession, the automatic total tracking station 8 will stop the vertical tracking and will be switched to the fished-height data drive mode again.

In this embodiment, the length of the laser sensor 45 is ±5 cm, and therefore, if vertical tracking is performed within this precision, the laser sensor 45 can receive a beam for data communication at all times. This is a numerical value which will not interfere with the tracking performance of the automatic total tracking station 8.

In addition, if the vertical tracking servo response is reduced to such a degree as not to follow vibration of a heavy machine (construction machine) and fine deviation is corrected with the vertical deviation $\Delta Z$ shown in FIG. 7, precision will be enhanced.

The present invention can perform both the high precision construction employing the fan-like laser beam P3 and the construction with no limitation on a height direction where the fan-like laser beam P3 is used only in data communication, without changing the entire structure.

In the aforementioned embodiments, while two-dimensional laser scanning has been performed by the automatic total tracking station 8, a method of receiving light with a CCD may be employed. In this case, a light emitting element is employed as a target.

While the present invention has been described with reference to preferred embodiments thereof, the invention is not to be limited to the details given herein, but may be modified within the scope of the appended claims.

What is claimed is:

1. An automatic control system for a construction machine, comprising:

a ground leveling implement, a target, and a laser sensor provided in said construction machine;

a survey unit for projecting a laser beam indicating a finished-plane height toward said laser sensor, said survey unit having coordinate position measuring means for optically measuring a coordinate position of said target;

storage means for storing finished-plane height data in correspondence with a horizontal coordinate position in said coordinate position;

computation means for computing a finished-plane height at the horizontal coordinate position, based on determined finished-plane height data;

modulation means for modulating said laser beam, based on construction information at said horizontal coordinate position, and for transmitting said construction information to said laser sensor; and demodulation means for demodulating said construction information, based on the laser beam received by said laser sensor;

wherein said survey unit is equipped with a finished-height data drive mode in which said laser beam is rotated in a vertical direction by rotation means so that a height of said laser beam at said horizontal coordinate position becomes a height from a determined finished plane and wherein said construction machine is provided with control means for controlling said ground leveling implement so that said ground leveling implement reaches said finished-plane height, based on a position at which said laser beam is received on said laser sensor, and also controlling said ground leveling implement, based on demodulated construction information.

2. The automatic control system for a construction machine as set forth in claim 1, wherein:

said survey unit is equipped with an automatic vertical tracking mode in which said rotation means is controlled so that said target is tracked with respect to a height direction; and when a measured coordinate position of said target is outside a predetermined range, said survey unit is switched from said finished-height data drive mode to said automatic vertical tracking mode.

3. The automatic control system for a construction machine as set forth in claim 1, wherein said laser sensor and said target are integrally stood up in said ground leveling implement.

4. The automatic control system for a construction machine as set forth in claim 1, wherein when data on the coordinate position of said target is input from said survey unit to said computation means, said computation means controls said rotation means, based on said finished-plane height data and predetermined finished-height data that is stored in said storage means and concerns a finished height from a lower edge of said ground leveling implement to a vertical center of said laser sensor.

5. The automatic control system for a construction machine as set forth in any one of claims 1 through 4, wherein said survey unit can measure a distance from itself to said target.

6. The automatic control system for a construction machine as set forth in any one of claims 1 through 4, wherein said construction information is inclination information of said ground leveling implement.

7. The automatic control system for a construction machine as set forth in any one of claims 1 through 4, wherein said construction information is management information of a center line of road construction.

8. The automatic control system for a construction machine as set forth in any one of claims 1 through 4, wherein said construction information is drive information of said construction machine.

9. The automatic control system for a construction machine as set forth in any one of claims 2 through 4, wherein said construction information is vertical deviation data in said automatic vertical tracking mode.

10. The automatic control system for a construction machine as set forth in claim 1, wherein said computation means computes a deviation between a height of said target based on the finished-plane height data at the horizontal coordinate position and a height of said target which has been measured in fact, and data on said deviation is stored and is employed as construction evaluation information.

* * * * *

UNITED STATES PATENT AND TRADEMARK OFFICE
CERTIFICATE OF CORRECTION

PATENT NO.: 6,016,455
DATED: 01/18/00
INVENTOR(S): FUMIO OHTOMO et al.

It is certified that an error appears in the above-identified patent and that said Letters Patent is hereby corrected as shown below:

On the cover page, left column, item [73] should read: "Assignees: Kabushiki Kaisha Topcon, Tokyo, Japan and Topcon Laser Systems, Inc., California, USA"

Signed and Sealed this

Twentieth Day of February, 2001

Attest:

NICHOLAS P. GODICI

Attesting Officer     Acting Director of the United States Patent and Trademark Office